United States Patent
Oka et al.

(10) Patent No.: US 6,183,049 B1
(45) Date of Patent: Feb. 6, 2001

(54) BRAKE BOOSTING SYSTEM

(75) Inventors: Hiroyuki Oka; Hidefumi Inoue; Yoshiyasu Takasaki; Masahiro Shimada, all of Higashimatsuyama; Mamoru Sawada; Yuzo Imoto, both of Kariya, all of (JP)

(73) Assignee: Bosch Braking Systems Co., Ltd., Tokyo (JP)

( * ) Notice: Under 35 U.S.C. 154(b), the term of this patent shall be extended for 0 days.

(21) Appl. No.: 09/226,113

(22) Filed: Jan. 7, 1999

(30) Foreign Application Priority Data

Jan. 13, 1998 (JP) .................................. 10-004932
Oct. 13, 1998 (JP) .................................. 10-290502

(51) Int. Cl.[7] .................................................. B60T 8/44
(52) U.S. Cl. ........................................................ 303/114.1
(58) Field of Search ........................... 303/114.1, 115.1, 303/115.2, 116.1, 119.1, 114.2; 188/155, 355, 358; 60/552

(56) References Cited

U.S. PATENT DOCUMENTS 5,496,101 * 3/1996 Kurokawa ........................... 303/125
5,735,124 * 4/1998 Cords .................................... 60/548

* cited by examiner

Primary Examiner—Christopher P. Schwartz
Assistant Examiner—C. T. Bartz
(74) Attorney, Agent, or Firm—Kanesaka & Takeuchi (57) ABSTRACT

In a brake boosting system the present invention, as it is decided that brake assist is necessary, a pump 53 is driven, and a solenoid valve 72 is switched to its communication position, and a solenoid shut-off valve 75 is opened. Then, the pump 53 sucks brake fluid from a reservoir 9 through the solenoid valve 72 and sends out the brake fluid to the pressure intensifying chamber 21 through the solenoid shut-off valve 75. At this point, an output shaft 11 has already advanced and a radial hole 38 is positioned ahead of a seventh cup sealing member 31 so that the pressure intensifying chamber 21 and the reaction chamber 33 are shut off from the reservoir 9 so as to be in the sealed state. Therefore, pump discharge pressure is supplied to the pressure intensifying chamber 21 and the reaction chamber 33 so that the pressure in these chambers is intensified. Since the intensified pressure acts on the primary piston 12, the master cylinder pressure is intensified to a value greater than that of normal braking. As mentioned above, by intensifying the master cylinder pressure when necessary, large braking force can be obtained with a simple structure.

9 Claims, 6 Drawing Sheets

BRAKE BOOSTING SYSTEM

BACKGROUND OF THE INVENTION

The present invention relates to a brake boosting system for providing intensified braking force by directly boosting master cylinder pressure.

Conventionally, a brake boosting system used in an automobile is provided with a booster, which boosts input to a predetermined magnitude by using hydraulic pressure such as negative pressure or fluid pressure and a master cylinder (hereinafter, sometimes referred to as "MCY") is actuated by the output of the booster, thereby obtaining large braking force from small leg power on the brake pedal.

Conventionally used in a vacuum brake boosting system provided with a vacuum booster is negative pressure produced in an engine. Recently, however, fuel consumption reduction of an engine is desired, whereas lower negative pressure is produced in the engine. As a result of this, output of a vacuum booster is also reduced. One of measures to cope with this reduction in the output is enlargement of the vacuum booster. However, this enlargement makes it quite difficult to install the vacuum booster in a small engine room.

On the other hand, a fluid pressure brake boosting system provided with a fluid pressure booster has a problem that parts such as a pump and an accumulator are required, thereby increasing the cost.

In such brake boosting systems, it is desired that, in case of emergency braking, the boosting device quickly produces braking force larger than that in case of normal braking.

among inexpert drivers, there must be a person who can not pedal a brake pedal fully so as not to develop large braking force. In this case, it is desired to provide braking assist for ensuring that large braking force is obtained even by such an inexpert driver.

In the conventional brake boosting systems, however, since the servo ratio of the servo control is constant during the output of the braking force, not only braking force larger than that for normal braking can nor be quickly produced for emergency braking, but also no braking assist for ensuring that large braking force is obtained even by the inexpert driver is provided. Therefore, it is difficult to meet the aforementioned demands.

SUMMARY OF THE INVENTION

The object of the present invention provide a brake boosting system with a simple structure which can intensify master cylinder pressure to output large braking force when necessary.

For accomplishing the object, a brake boosting system of the present invention comprises at least: a brake operating member for braking operation; a reservoir for storing brake fluid; a master cylinder for producing master cylinder pressure; and a brake cylinder for producing braking force when the master cylinder pressure is introduced into the brake cylinder, wherein corresponding to the operation of the brake operating member, an input shaft advances to actuate a master cylinder piston, thereby producing the master cylinder pressure. The brake boosting system further comprising: a pressure intensifying chamber facing the rear end of the master cylinder piston; a reaction chamber disposed between the master cylinder piston and the input shaft and always communicating with the pressure intensifying chamber; a fluid pressure source for producing fluid pressure and supplying the fluid pressure into the pressure intensifying chamber; and a communication control means which allows the pressure intensifying chamber and the reaction chamber to communicate with the reservoir when the system is inoperative, and intercepts the pressure intensifying chamber and the reaction chamber from communicating with the reservoir when the input shaft advances.

The brake boosting system of the present invention as structured above may consist of a system of open centre type. When the brake boosting system is inoperative, the pressure intensifying chamber communicates with both the fluid pressure source and the reservoir by the communication control means. During a normal braking operation, because of the advance of the input shaft, the pressure intensifying chamber is shut off from the reservoir by the communication control means. During this normal braking, the fluid pressure of the fluid pressure source is prevented from being supplied to the pressure intensifying chamber not to intensifying the master cylinder pressure of the master cylinder, thereby performing the braking operation at normal braking pressure. Also during the braking operation when braking assist is necessary, the pressure intensifying chamber is shut off from the reservoir by the communication means. In this case where the intensified pressure is required, the fluid pressure of the fluid pressure source is supplied to the pressure intensifying chamber so as to intensify the master cylinder pressure in the master cylinder, thereby performing the braking operation at braking pressure higher than the normal braking pressure. Therefore, the pressure intensifying can be securely obtained when it is required to quickly provide large braking force such as emergency braking.

Further, the present invention further comprises a solenoid control valve disposed between the pressure intensifying chamber and the fluid pressure source for controlling the communication between the pressure intensifying chamber and the fluid pressure source.

In the brake boosting system of the present invention, the supply and discharge of the fluid pressure from the fluid pressure source to the pressure intensifying chamber is controlled by the solenoid control valve. Therefore, when the pressure intensification is necessary, the fluid pressure can be rapidly and securely supplied from the fluid pressure source to the pressure intensifying chamber.

A brake boosting system of the present invention comprises at least: a brake operating member for braking operation; a reservoir for storing brake fluid; a master cylinder for producing master cylinder pressure; and a brake cylinder for producing braking force when the master cylinder pressure is introduced into the brake cylinder, wherein corresponding to the operation of the brake operating member, an input shaft advances to actuate a master cylinder piston, thereby producing the master cylinder pressure. The brake boosting system further comprises: a pressure intensifying chamber facing the rear end of the master cylinder piston; a reaction chamber disposed between the master cylinder piston and the input shaft and always communicating with the pressure intensifying chamber; a fluid pressure source for producing fluid pressure; and a communication control means which allows the pressure intensifying chamber and the reaction chamber to communicate with the reservoir and intercepts the pressure intensifying chamber and the reaction chamber from communicating with the fluid pressure source when the system is inoperative, and blocks the pressure intensifying chamber and the reaction chamber from communicating with the reservoir and allows the pressure intensifying chamber and the reaction chamber to communicate with the fluid pressure source when the input shaft advances.

The brake boosting system of the present invention as structured above may consist of a system of closed centre type. When the brake boosting system is inoperative, the pressure intensifying chamber is shut off from the fluid pressure source and communicates with the reservoir by the communication control means. During a normal braking operation, because of the advance of the input shaft, the pressure intensifying chamber is shut off from the reservoir and is allowed to communicate with the fluid pressure source by the communication control means. During this normal braking operation, the fluid pressure of the fluid pressure source is prevented from being supplied to the pressure intensifying chamber not to intensifying the master cylinder pressure of the master cylinder, thereby performing the braking operation at normal braking pressure. Also during the braking operation when braking assist is necessary, the pressure intensifying chamber is shut off from the reservoir and is allowed to communicate with the fluid pressure source in the same manner. In this case where the intensified pressure is necessary, the fluid pressure of the fluid pressure source is supplied to the pressure intensifying chamber so as to intensify the master cylinder pressure in the master cylinder, thereby performing the braking operation at braking pressure higher than the normal braking pressure. Therefore, the pressure intensifying can be securely obtained when it is required to quickly provide large braking force such as emergency braking.

Further, the present invention further comprises a booster for boosting the input from the brake operating member and outputting the boosted power through an output shaft thereof, wherein the input shaft of the master cylinder is actuated through the output shaft of the booster, or, the output shaft of the booster composes the input shaft of the master cylinder.

In the brake boosting system of the present invention, since the booster boosts the input from the brake operating member, the master cylinder pressure is intensified not only by the fluid pressure of the pressure intensifying chamber but also by the output of the booster.

Furthermore, the present invention further comprises a solenoid control valve disposed on a fluid pressure supplying line between the pressure intensifying chamber or the communication control means and the fluid pressure source, and an electronic control unit which determines whether normal braking should be conducted or braking assist is necessary, corresponding to a brake operational condition such as leg power exerted on the brake operating member and/or the rate of rise of the leg power, sets the solenoid control valve to its shut-off position when it is decided that the normal braking should be conducted, and sets the solenoid control valve to its communication position when it is decided that the braking assist is necessary.

In the brake boosting system, since the electronic control unit operates the solenoid control valve when it is decided that the braking assist is necessary such as emergency braking, the braking assist is securely and rapidly conducted, thereby rapidly obtaining large braking force even with relatively small input.

Moreover, the present invention further comprises a solenoid control valve disposed on a fluid pressure supplying line between the pressure intensifying chamber or the communication control means and the fluid pressure source, and an electronic control unit which, corresponding to pressure of a pressure source for the booster, sets the solenoid control valve to its shut-off position when the pressure exceeds a predetermined value, and sets the solenoid control valve to its communication position when the pressure is lower than the predetermined value.

In the brake boosting system, in case of failure in the fluid pressure source of the booster, for example a proper detection means detects the failure and sends a signal to the electronic control unit whereby the electronic control unit conducts the braking assist control. Therefore, the large braking force can be ensured even in the event of the pressure fluid failure.

In addition, in the present invention, the pump is a pump for anti-skid control (hereinafter, sometimes referred to as "ABS pump"), a pump for traction control (hereinafter, sometimes referred to as "TRC pump"), or a pump for both anti-skid control and traction control.

In the brake boosting system of the present invention, since the ABS pump or the TRC pump, which is already provided, is also used as the fluid pressure source so that another pump exclusively for the braking assist control is not required, the brake pressure boosting system can be made in a simpler structure and at a lower cost.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
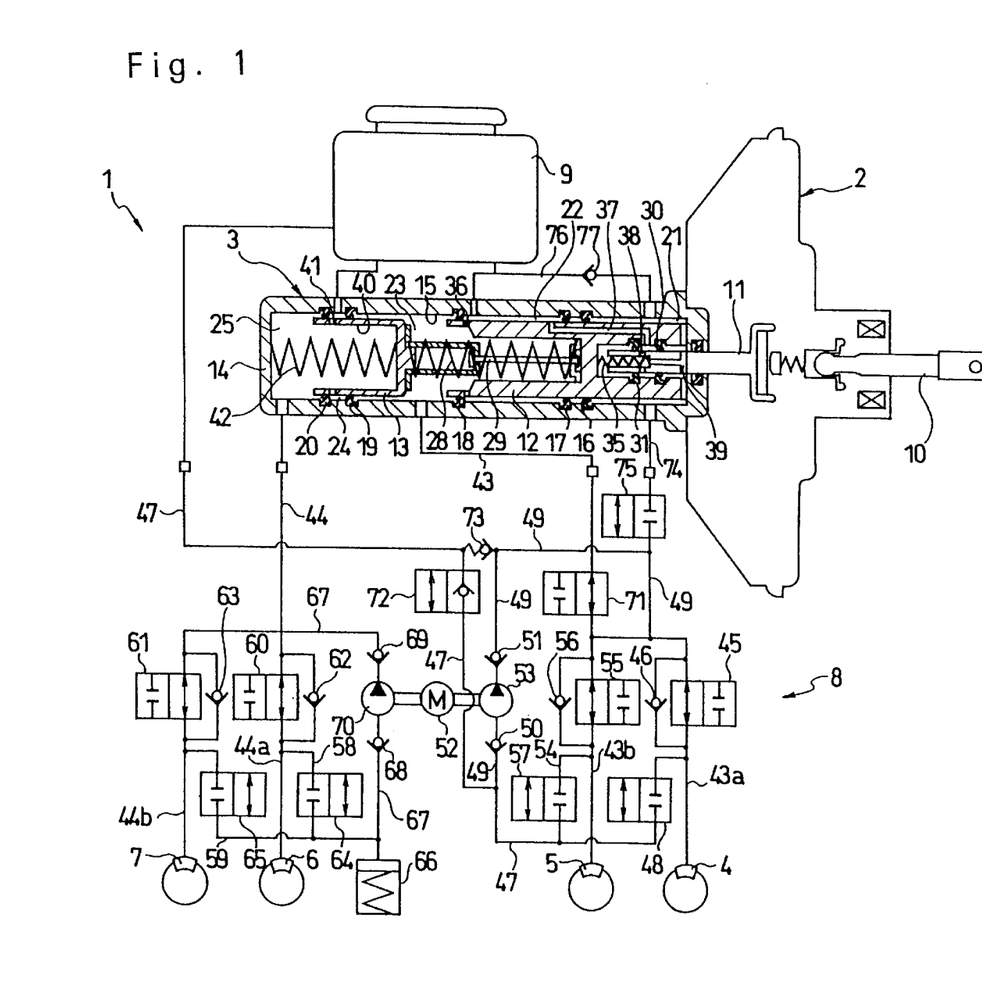
FIG. 1 is a sectional view showing a first embodiment of a brake boosting system according to the present invention.
Figure 2:
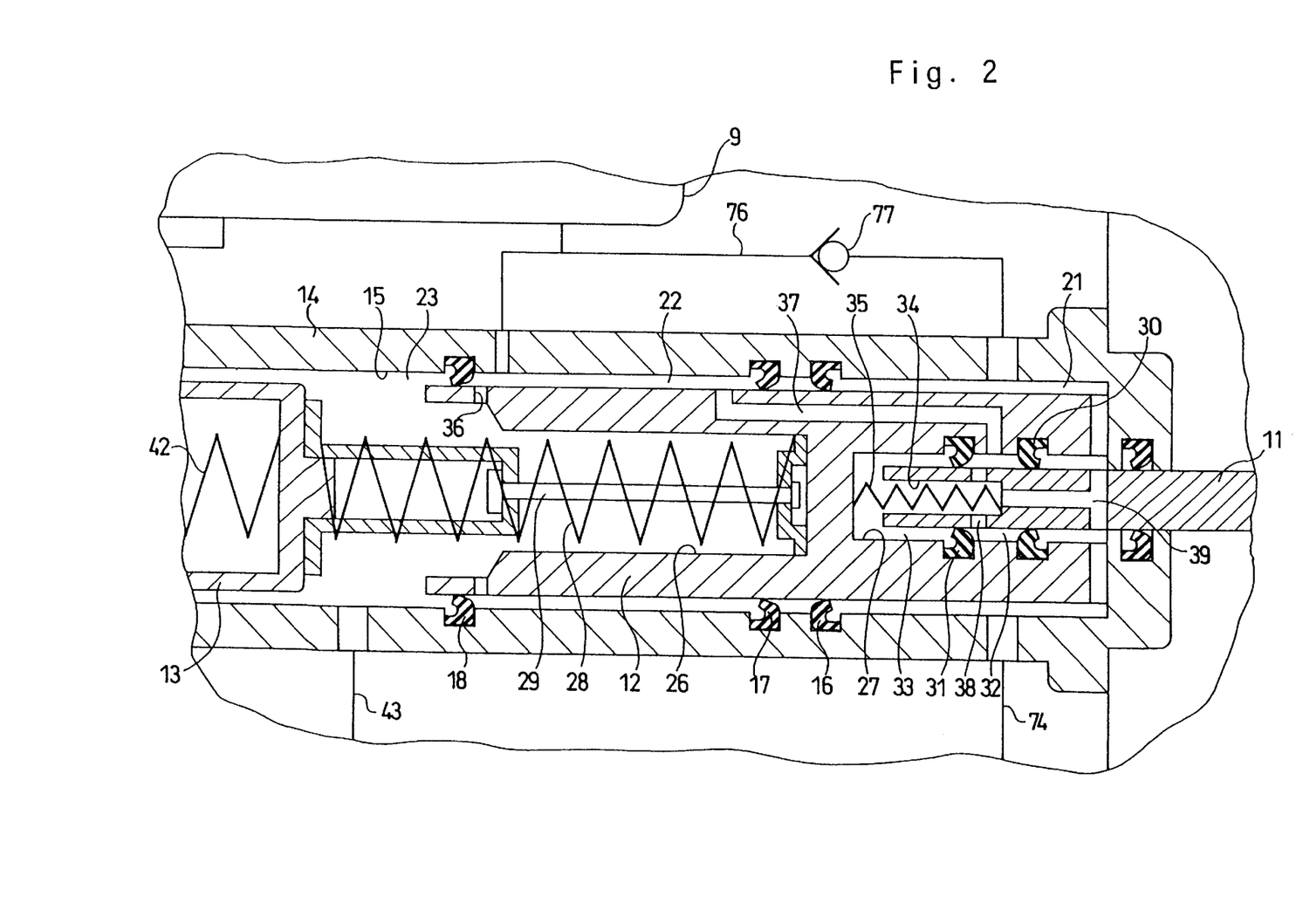
FIG. 2 is a partially enlarged sectional view of the brake boosting system shown in FIG. 1.

FIG. 1 is a view showing a first embodiment of a brake boosting system according to the present invention, and FIG. 2 is a partially enlarged sectional view of a master cylinder of the brake boosting system shown in FIG. 1.

As shown in FIG. 1, the brake boosting system 1 of the first embodiment comprises the vacuum booster 2 which boosts and outputs leg power exerted on a brake pedal, a MCY 3 of tandem type which is actuated by the output of the vacuum booster 2 to produce MCY pressure, wheel cylinders (hereinafter, sometimes referred to as "WCY") 4, 5, 6, and 7 which produce braking forces when the MCY pressure is supplied and are disposed for two circuits, respectively (WCYs 4 and 5 relating to driving wheels and WCYs 6 and 7 relating to non-driving wheels, in this embodiment), an anti-skid control/traction control unit (hereinafter, sometimes referred to as "ABS/TRC") 8 for the two circuits which conducts Anti-skid Control of controlling WCY pressure of the WCYs 4, 5, 6, and/or 7 to cancel locking tendency when a braked wheel is in locking tendency, and conducts Traction Control for automatically applying braking pressure on the driving wheels WCYs 4, 5 to cancel slipping tendency when the driving wheels are in slipping tendency, and a reservoir 9 in which braking fluid is stored.

The vacuum booster 2 is well known and common whereas the detailed description will be omitted. In the vacuum booster 2, an input shaft 10 is moved forward by pedaling the brake pedal (not shown) to switch a control valve not shown. Then, atmosphere is introduced into a variable pressure chamber defined by a diaphragm piston (not shown) so as to develop differential pressure between the variable pressure chamber and the Constant pressure chamber. This differential pressure actuates the diaphragm piston whereby the leg power on the brake pedal is boosted and an output shaft 11 outputs the boosted power.

The MCY 3 comprises a primary piston 12 and a secondary piston 13 just like a well-known common tandem MCY. The pistons 12 and 13 are both formed as pistons of plunger type. That is, the primary piston 12 slidably penetrates first through third cup sealing members 16, 17, 18 disposed on the inner surface of an axial hole 15 formed in a housing 14 of the MCY 3 and the secondary piston 13 slidably penetrates fourth and fifth cup sealing members 19, 20 disposed on the inner surface of the axial hole 15.

In the axial hole 15 of the housing 14, a pressure intensifying chamber 21 is defined by the first cup sealing member 16, a first annular fluid chamber 22 is defined between the second and third cup seal members 17 and 18, a first fluid pressure chamber 23 is defined between the third and fourth cup sealing members 18 and 19, a second annular fluid chamber 24 is defined between the fourth and fifth cup sealing members 19 and 20, and a second fluid chamber 25 is defined by the fifth cup sealing member 20.

The first cup sealing member 16 is arranged to block the flow of brake fluid from the pressure intensifying chamber 21 to the opposite side about the first sealing member 16 and to allow the flow of brake fluid in the reverse direction. The second cup sealing member 17 is arranged to block the flow of brake fluid from the first annular fluid chamber 22 to the opposite side about the second cup sealing member 17 and to allow the flow of brake fluid in the reverse direction. The third cup sealing member 18 is arranged to block the flow of brake fluid from the first fluid pressure chamber 23 to the first annular fluid chamber 22 and to allow the flow of the brake fluid in the reverse direction. Further, the fourth cup sealing member 19 is arranged to block the flow of brake fluid from first fluid pressure chamber 23 to the second annular fluid chamber 24 and to allow the flow of the brake fluid in the reverse direction. Furthermore, the fifth cup sealing member 20 is arranged to block the flow of brake fluid from the second fluid pressure chamber 25 to the second annular fluid chamber 24 and to allow the flow of brake fluid in the reverse direction.

As shown in FIG. 2, the primary piston 12 has a first axial hole 26 formed in a front end portion (the left side in FIG. 2) thereof which opens toward the first fluid pressure chamber 23 and a second axial hole 27 formed in a rear end portion (the right side in FIG. 2) thereof which opens toward the pressure intensifying chamber 21 and the diameter is smaller than that of the first axial hole 26, so that the primary piston 12 is formed in a substantially cylindrical shape. Disposed in the first axial hole 26 are a rear end side of a first return spring 28 and a rear end side of a telescopic retainer 29, the maximum length of which is restricted, for supporting the first return spring 28 in the compressed state. The front end of the retainer 29 is always in contact with the secondary piston 13.

Disposed in the second axial hole 27 of the primary piston 12 is a front end portion of the output shaft 11 of the vacuum booster 2. The output shaft 11 slidably penetrates the sixth and seventh cup sealing member 30, 31 disposed on the inner surface of the second axial hole 27.

Also in the second axial hole 27 of the primary piston 12, a third annular fluid chamber 32 is formed between the sixth and seventh cup sealing members 30 and 31 and a reaction chamber 33 is formed by the seventh cup sealing member 31.

The sixth cup sealing member 30 is arranged to block the flow of brake fluid from the pressure intensifying chamber 21 to the third annular fluid chamber 32 and to allow the flow of brake fluid in the reverse direction. The seventh cup sealing member 31 is arranged to block the flow of brake fluid from the reaction chamber 33 to the third annular fluid chamber 32 and to arrow the flow of brake fluid in the reverse direction.

The output shaft 11 is provided with an axial hole 34 formed in a front end portion thereof which opens into the reaction chamber 33. Compressed and disposed between the output shaft 11 and the primary piston 12 is a second return spring 35 spring constant of which is smaller than that of the first return spring 28. When the output shaft 11 is in the illustrated inoperative position, the primary piston 12 and the output shaft 11 are separated from each other by the spring force of the second return spring 35. As the output shaft 11 advances, the second return spring 35 is compressed so that the primary piston 12 and the output shaft 11 contact with each other.

The primary piston 12 has a radial hole 36 formed in the front end portion thereof, which allows the communication between the first annular fluid chamber 22 and the first fluid pressure chamber 23. When the primary piston 12 is in the illustrated inoperative position, the radial hole 36 is positioned slightly behind the third cup sealing member 18 to allow the communication between the first annular fluid chamber 22 and the first fluid pressure chamber 23. As the primary piston 12 is actuated, the radial hole 36 passes over the third cup sealing member 18 so as not to allow the communication between the first annular fluid chamber 22 and the first fluid pressure chamber 23. The primary piston 12 has a passage 37 formed therein which always allows the communication between the first annular fluid chamber 22 and the third annular fluid chamber 32.

The output shaft 11 has a radial hole 38 formed in the front end portion thereof, which allows the communication between the third annular fluid chamber 32 and the reaction chamber 33. When the output shaft 11 is in the illustrated inoperative position, the radial hole 38 is positioned slightly behind the seventh cup sealing member 31 to allow the communication between the third annular fluid chamber 32 and the reaction chamber 33. As the output shaft 11 is actuated, the radial hole 38 passes over the seventh cup sealing member 31 so as not to allow the communication between the third annular fluid chamber 32 and the reaction chamber 33. As described later, the pressure intensifying chamber 21 is connected to a line 74 for supplying pump discharge pressure produced by a pump 53. The brake boosting system 1 of the first embodiment is of an open centre type, in which the pressure intensifying chamber 21 is connected to the line 74 at the input side and to the reservoir 9 when the output shaft 11 is inoperative, and is shut off from the reservoir 9 when the output shaft 11 is operative. The output shaft 11 has a passage 39 formed therein which always allows the communication between the pressure intensifying chamber 21 and the reaction chamber 33.

On the other hand, the secondary piston 13 is formed in a cylindrical configuration with a bottom and having an axial hole 40 which opens toward the second fluid pressure chamber 25 side. The secondary piston 13 has an radial hole 41 formed in the front end portion thereof which allows the communication between the second annular fluid chamber 24 and the second fluid pressure chamber 25. When the secondary piston 13 is in the illustrated inoperative position, the radial hole 41 is positioned slightly behind the fifth cup sealing member 20 to allow the communication between the second annular fluid chamber 24 and the second fluid pressure chamber 25. As the secondary piston 13 is actuated, the radial hole 41 passes over the fifth cup sealing member 20 so as not to allow the communication between the second annular fluid chamber 24 and the second fluid pressure chamber 25.

Compressed and disposed between the secondary piston 13 and the housing 14 is a third return spring 42, spring constant being larger than that of the first return spring 28.

The first fluid pressure chamber 23 is connected to the WCY 4, one of WCYs relating to one circuit, through a line 43 and a first branch 43a of the line 43 and to the WCY 5, the other one of the WCYs relating to the one circuit, through the line 43 and a second branch 43b of the line 43.

The second fluid pressure chamber 25 is connected to the WCY 6, one of WCYs relating to the other circuit, through a line 44 and a first branch 44a of the line 44 and to the WCY 7, the other one of the WCYs relating to the other circuit, through the line 44 and a second branch 44b of the line 44.

Disposed on the first branch 43a are a holding valve 45 which is a normally open solenoid shut-off valve and a check valve 46 for allowing only the flow of brake fluid from the WCY 4 to the MCY 3, the holding valve 45 and the check valve 46 being arranged in parallel. A discharge line 47 extends from the first branch 43a to the reservoir 9. Disposed on the discharge line 47 is a discharge valve 48 which is a normally closed solenoid shut-off valve. Disposed on a circular line 49 connecting the discharge line 47 and the first branch 43a is a pair of check valves 50, 51 allowing only the flow of brake fluid from the discharge line 47 to the first branch 43a. The pump 53 which is driven by a motor 52 is disposed on the circular line 49 between the check valves 50 and 51.

A holding valve 55, a check valve 56, and a discharge valve 57, which are completely the same as the holding valve 45, the check valve 46, the discharge valve 48, are disposed on the second branch 43b and a discharge line 54 connecting the second branch 43b and the discharge line 47.

Also for the other circuit, holding valves 60, 61, which are completely the same as the holding valve 45, check valves 62, 63, which are completely the same as the check valve 46, and discharge valves 64, 65, which are completely the same as the discharge valve 48 are provided on the first and second branches 44a, 44b, and discharge lines 58, 59 being branched from the first and second branches 44a, 44b, respectively. In the other circuit, the discharge lines 58, 59 are connected to a low-pressure accumulator 66. Disposed on a circular line 67 connecting the lowpressure accumulator 66 and the line 44 are check valves 68, 69 and a pump 70 which are completely the same as the check valves 50, 51 and the pump 53, respectively.

The reservoir 9, the first and second branches 43a, 43b, 44a, 44b, the holding valves 45, 55, 60, 61, the check valves 46, 50, 51, 56, 62, 63, 68, 69, the discharge lines 47, 54, 58, 59, the discharge valves 48, 57, 64, 65, the circular lines 49, 67, the motor 52, the pumps 53, 70, and the low pressure accumulator 66 compose together the ABS/TRC 8.

A normally open solenoid shut-off valve 71 is disposed on the line 43 and a solenoid valve 72 is disposed on the discharge line 47 at the reservoir 9 side about a branch point of the circular line 49. The solenoid valve 72 has a check position, where only the flow of brake fluid from the reservoir 9 to the annular line 49 is allowed, and a communication position.

A relief valve 73 is disposed between the circular line 49 at the downstream side about the check valve 51 and the discharge line 47 between the reservoir 9 and the solenoid valve 72. The relief valve 73 allows fluid pressure in the circular line 49 to escape to the discharge line 47 when the fluid pressure in the circular line 49 becomes a predetermined value or more.

Disposed on the line 74 connecting the pressure intensifying chamber 21 of the MCY 3 and the circular line 49 at downstream in relation to the check valve 51 is a normally closed solenoid shut-off valve 75.

The first and second annular fluid chambers 22, 24 of the MCY 3 always communicate with the reservoir 9. Disposed on a line 76 connecting the pressure intensifying chamber 21 and the reservoir 9 is a check valve 77 allowing only the flow of brake fluid from the reservoir 9 to the pressure intensifying chamber 21.

In the brake boosting system 1 of the first embodiment as structured above, all components are in the inoperative positions as illustrated when the brake boosting system is inoperative. In this state, the pressure intensifying chamber 21 of the MCY 3 communicates with the reservoir 9 through the passage 39 and the radial hole 38 of the output shaft 11, the third annular fluid chamber 32, the passage 37, and the first annular fluid chamber 22 and thus become at the atmospheric pressure. The first fluid pressure chamber 23 of the MCY 3 communicates with the reservoir 9 through the radial hole 36 and the first annular fluid chamber 22, and the second fluid pressure chamber 25 communicates with the reservoir 9 through the radial hole 41 and the second annular fluid chamber 24 in the same manner so that the first and second fluid pressure chambers 23 and 25 are at the atmospheric pressure.

As the brake pedal is pedaled at this state to perform the normal braking operation, the vacuum booster 2 is actuated and the output shaft 11 advances and comes in contact with the primary piston 12 to transmit output of boosted power relative to the leg power on the brake pedal to the primary piston 12. By the advance of the output shaft 11, the radial hole 38 passes over the seventh cup sealing member 31 so that the reaction chamber 33 and the pressure intensifying chamber 21 are shut off from the reservoir 9.

By the output of the vacuum booster 2, the primary piston 12 advances and the radial hole 36 passes over the third cup sealing member 18 so that the first fluid pressure chamber 23 is shut off from the reservoir 9. The radial hole 38, the seventh cup sealing member 31, and the solenoid shut-off valve 75 compose together a communication control means of the present invention. As the primary piston 12 further advances, MCY pressure is developed in the first fluid pressure chamber 23. By the MCY pressure, the secondary piston 13 also advances so that the radial hole 41 passes the fifth cup sealing member 20 to develop MCY pressure in the second fluid pressure chamber 25. These MCY pressures are introduced into the WCYs 4, 5, 6, 7 through lines 43, 44, thereby performing the normal braking.

Though the volume of the pressure intensifying chamber 21 is increased by the advance of the primary piston 12 so that the pressure in the pressure intensifying chamber 21 is directed toward negative pressure at this point, brake fluid is supplemented from the reservoir 9 to the pressure intensifying chamber 21 through the check valve 77 so that the inside of the pressure intensifying chamber 21 is held at the atmospheric pressure. Therefore, the primary piston 12 is not affected and thus can smoothly advance.

When the brake pedal is released for canceling the braking operation, the vacuum booster 2 becomes inoperative and the output shaft 11 retreats in a direction toward the inoperative position. Since the reaction chamber 33 and the pressure intensifying chamber 21 both are shut off from the reservoir 9 so as to be in the sealed state until the radial hole 38 moves behind the seventh cup sealing member 31, neither the primary piston 12 nor the secondary piston 13 retreats but only the output shaft 11 retreats.

As the output shaft 11 further retreats and the radial hole 38 passes over the seventh cup sealing member 31, both the reaction chamber 33 and the pressure intensifying chamber 21 communicate with the reservoir 9 through the same way as that of the inoperative state. Therefore, the brake fluid in both the reaction chamber 33 and the pressure intensifying chamber 21 is discharged to the reservoir and the primary piston 12 retreats. Accordingly, the secondary piston 13 also retreats. The braking pressures of the WCYs 4, 5, 6, 7 are reduced. As the radial holes 36, 41 of the pistons 12, 13 are moved to positions behind the third and fifth cup sealing member 18, 20, respectively, the first fluid pressure chamber 23 and the second fluid pressure chamber 25 both are allowed to communicate with the reservoir 9 to be at the atmospheric pressure. Finally, the brake boosting system 1 becomes in the inoperative state as illustrated, thereby canceling the braking action. Assuming that the MCY pressure is P, the input of the MCY 3 i.e. the output of the vacuum booster 2 is F, the sectional area of the MCY piston is A (the sectional areas of the primary piston 12 and the secondary piston 13 are equal to each other), and the spring force of the first return spring 28 is $SPG_1$, the input-output characteristic of the master cylinder 3 during the normal braking is found by the following Equation 1 because of the balance with the primary piston 12;

$$P=(F/A)-(SPG_1/A) \quad (1)$$

When the brake pedal is pedaled with a rate of rise of the leg power or pedal stroke of the brake pedal which is higher than that for normal braking, an electronic control unit not shown detects the high rate rise according to a detected signal from a suitable detection sensor (not shown) and determines that the braking assist control such as for emergency braking is required. In this case, the electronic control unit drives the motor 52 to actuate the pump 53, switches the solenoid valve 72 to the communication position and opens the solenoid shut-off valve 75. Then, the pump 53 sucks the brake fluid of the reservoir 9 via the solenoid valve 72 and sends out the brake fluid to the pressure intensifying chamber 21 via the solenoid shut-off valve 75. At this point, the output shaft 11 already advanced to a position where the pressure intensifying chamber 21 and the reaction chamber 33 are both shut off from the reservoir 9 and become in the sealed state in the same manner as described above, so the pressure in the pressure intensifying chamber 21 and the pressure in the reaction chamber 33 are intensified to the pump discharge pressure.

By the pump discharge pressure in the pressure intensifying chamber 21 and the reaction chamber 33, the primary piston 12 advances to develop MCY pressure in the first fluid pressure chamber 23 and the secondary piston 13 advances to develop MCY pressure in the second fluid pressure chamber 25 so as to perform the braking action in the same manner as mentioned above. By the pump discharge pressure in the reaction chamber 33, the output shaft 11 is pushed back and stops at a position where force produced by the fluid pressure in the reaction chamber 33 acting on the output shaft 11 and the output of the output shaft 11 are balanced. Since the pressure receiving area of the primary piston 12 where the pump discharge pressure acts and the pressure receiving area of the primary piston 12 on where the MCY pressure acts are equal to each other, the MCY pressure and the pump discharge pressure become equal to each other. Assuming that the MCY pressure (the pump discharge pressure) is P, the input of the MCY 3 i.e. the output of the vacuum booster 2 is F, the sectional area of the output shaft 11 is B, and the spring force of the second return spring 35 is $SPG_2$, the input-output characteristic of the master cylinder 3 while the assisted braking is found by the following Equation 2 because of the balance with the output shaft 11;

$$P=(F/B)-(SPG_2/B) \quad (2)$$

As comparison between Equation 2 and Equation 1 mentioned for normal braking is made, B<A is found, that is, the servo ratio for the assisted braking is larger than that for normal braking. The brake boosting system 1 of this embodiment can ensure the braking assist control.

When the pedaling of the brake pedal is released, the electronic control unit stops the motor 52 to stop the pump 53, switches the solenoid valve 72 to a check position, and closes the solenoid shut-off valve 75 according to a signal from the detection sensor. Because of the close of the solenoid shut-off valve 75, the pressure intensifying chamber 21 and the reaction chamber 33 become in the sealed state.

In the same manner as the case of canceling the normal braking, the output 11 first retreats and the pressure intensifying chamber 21 and the reaction chamber 33 both are allowed to communicate with the reservoir 9 so that the primary piston 12 and the secondary piston 13 retreat. Therefore, the vacuum booster 2 and the master cylinder 3 become in the inoperative state as illustrated, thereby canceling the braking action.

If the solenoid shut-off valve 75 remains open during the cancellation of the assisted braking, the pressure intensifying pressure chamber 21 is connected to to WCYs 4, 5, the decrease in the pressure of the pressure intensifying chamber 21 so that there is possibility of delay in the return of primary piston 12. Therefore, it is preferable that the solenoid shut-off valve 75 is closed during the cancellation of the assisted braking.

Since the ABS/TRC 8 performs the same action as a conventional ABS by reducing, retaining, and increasing the brake pressure in order to cancel locking tendency of a braked wheel, the detailed description is omitted. Only the simple description will be made. Once the electronic control unit detects locking tendency of at least one wheel during braking based on wheel-speed signals from wheel sensors not shown, the electronic control unit performs ABS control by controlling the holding valves 45, 55, 60, and 61, the discharge valves 48, 57, 64, and 65, the motor 52, the pump 53, 70, and the solenoid valve 72, respectively, to repeat the reducing, retaining, and increasing of the brake pressure so as to cancel the locking tendency.

In addition, since the ABS/TRC 8 performs the same action as a conventional TRC by applying braking pressure on a driving wheel in order to cancel slipping tendency of a driving wheel, the detailed description is omitted. Only the simple description will be made. Once the electronic control unit detects slipping tendency of at least one driving wheel based on wheel-speed signals from the wheel sensors for the driving wheels, the electronic control unit performs TRC control by controlling the motor 52 and the pump 53 (in this embodiment, the pump 70 is also controlled), and the solenoid shut-off valve 71, respectively, and supplies pump discharge pressure to the WCY of the driving wheel, which is in slipping tendency, to cancel the slipping tendency.

When the negative pressure of a negative-pressure source in the vacuum booster 2 is decreased to a predetermined value or less, a negative pressure sensor not shown detects the fact and, when the normal braking operation is conducted, the electronic control unit sends pump discharge pressure into the pressure intensifying chamber 21 based on a detected signal from the negative pressure sensor in the same manner as the case of the assisted braking. Since the MCY pressure is intensified in this way, large braking force is obtained even when the negative pressure of the negative pressure source is decreased to lower than the predetermined value so that the output of the vacuum booster 2 is decreased.

Figure 3:
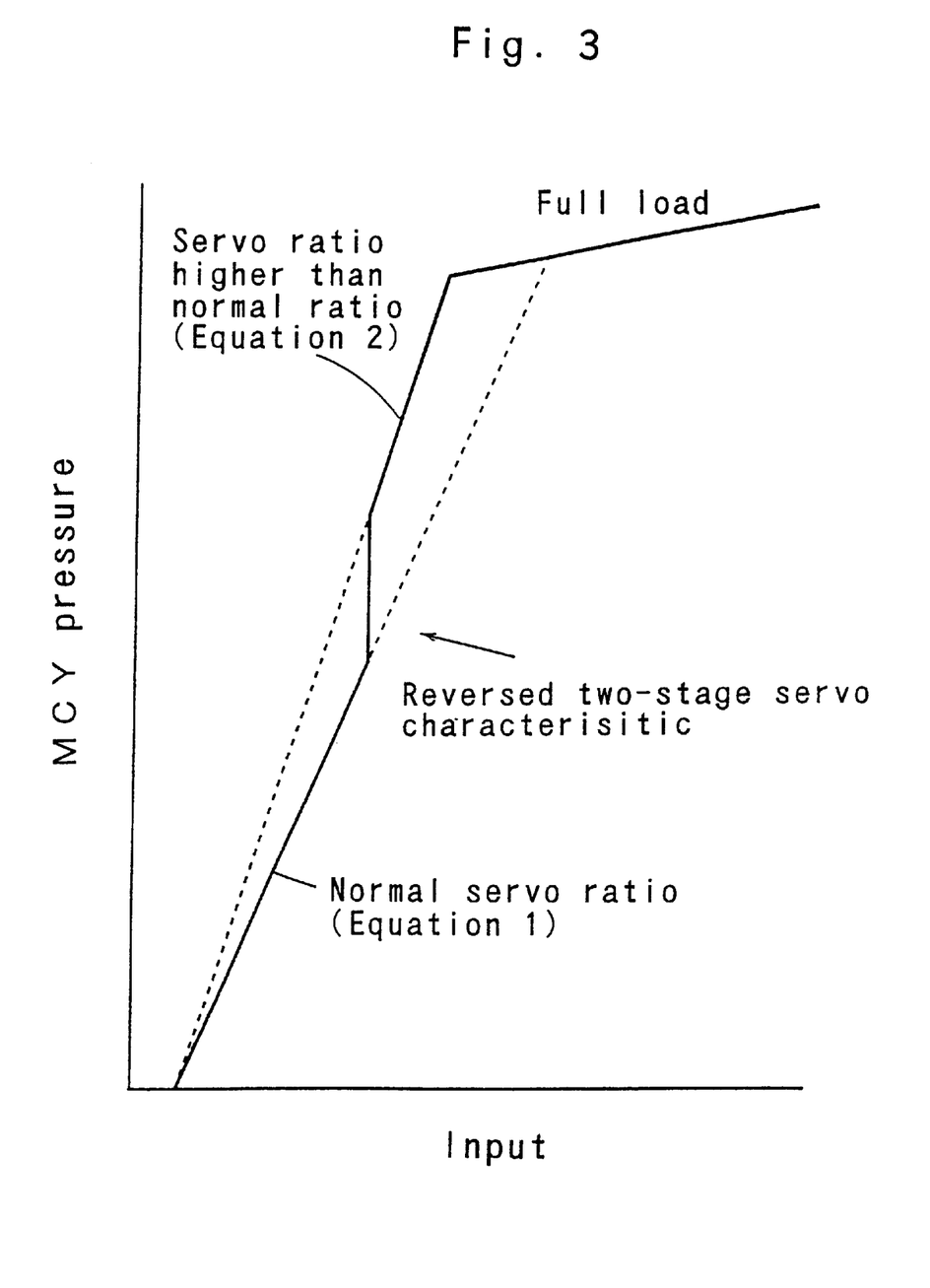
FIG. 3 is a view for explaining two-stage servo characteristic.

Also for the normal braking operation, when the MCY pressure is increased at a normal servo ratio relative to the pedal input, the vacuum boosting system may have a reversed two-stage servo characteristic allowing the servo control at a servo ratio higher than that for normal braking after the pedal input exceeds a predetermined value, as shown in FIG. 3. That is, when, during the normal braking operation at the normal servo ratio, the electronic control unit detects that the pedal input exceeds the predetermined value at a servo ratio switching point according to a detected signal from a suitable detection sensor (not shown) such as a pedal stroke sensor for detecting the stroke of the brake pedal, a leg power sensor for detecting the leg power, or a pressure sensor for detecting the MCY pressure, the electronic control unit switches the solenoid valve 72 and the solenoid shut-off valve 75 and drives the motor 52 and the pump 53. Accordingly, the servo ratio is changed from normal ratio expressed by Equation 1 to the higher servo ratio expressed by Equation 2 as shown in FIG. 3. In this way, large braking force can be obtained relative to an input exceeding the predetermined value.

Though, recently, the negative pressure tends to be lessened because of the fuel consumption reduction of an engine, large MCY pressure can be obtained by the aforementioned reversed two-stage servo characteristic. Accordingly, large braking force can be securely obtained even though the negative pressure is lessened, thereby effectively coping with the tendency of negative pressure reduction.

Though the vacuum booster 2 is used with the master cylinder 3 in the first embodiment, the present invention does not always require the vacuum booster 2 so that the vacuum booster 2 can be omitted. In this case, instead of the output shaft 11 of the vacuum booster 2, an input shaft of the master cylinder 3 which is connected to the brake pedal is required but the other structure is completely the same as the case of the output shaft 11.

Though the present invention is applied to the brake system provided with the ABS/TRC 8 and employs the pump 53 of the ABS/TRC 8 as the pump for supplying pump discharge pressure into the pressure intensifying chamber 21 in the first embodiment, the present invention can be applied to a brake system which is provided only one of ABS and TRC. In this case, a pump used for the ABS or the TRC may be utilized. Another pump may be utilized exclusively for supplying pressure into the pressure intensifying chamber 21 whether the ABS or the TRC is provided or not.

Figure 4:
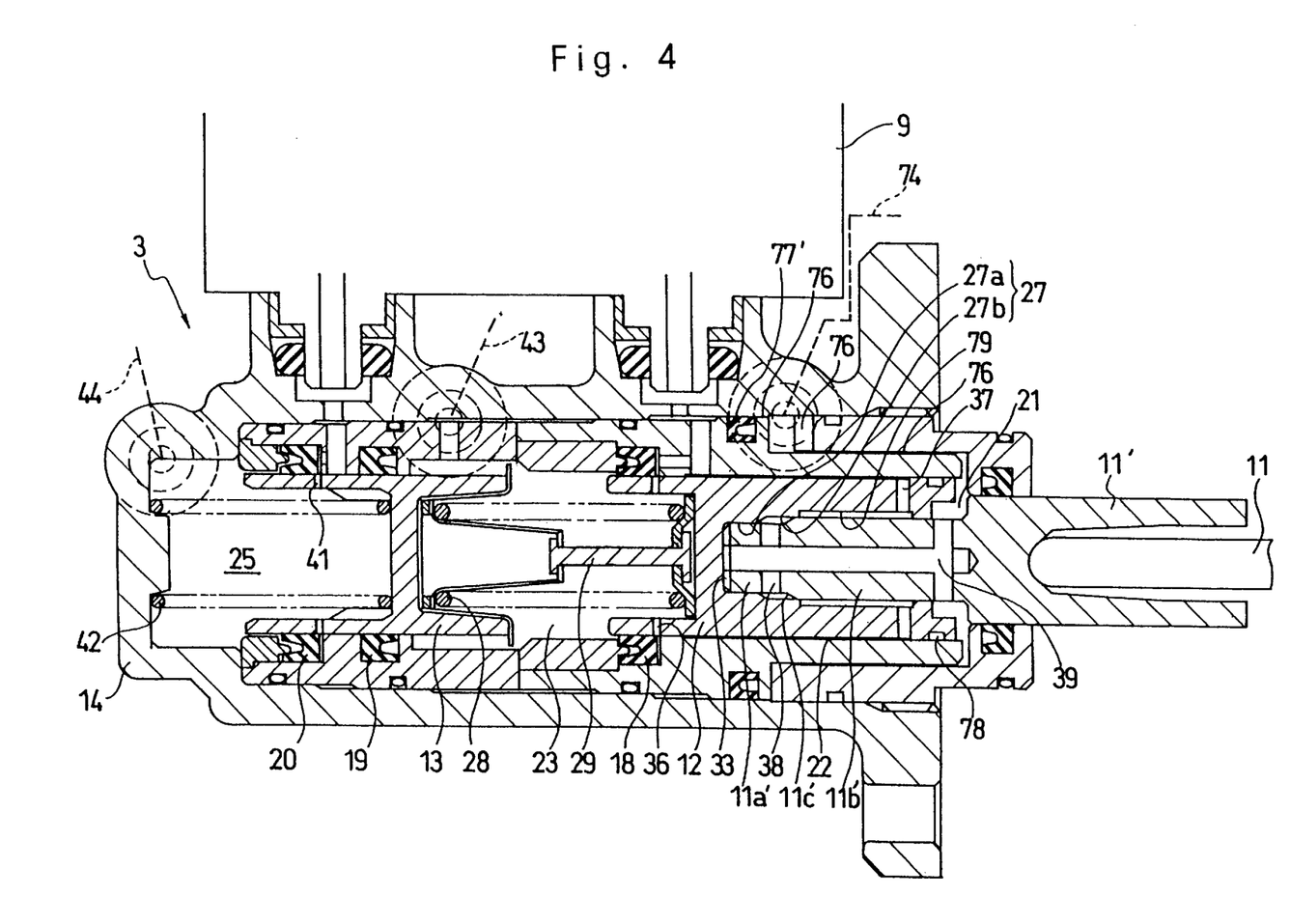
FIG. 4 is a sectional view showing a second embodiment of the present invention.

FIG. 4 is a view showing a second embodiment of the present invention. It should be noted that parts similar or corresponding to the parts of the first embodiment will be marked by the same reference numerals so that the description about the parts will be omitted. The same is true for the description of the following other embodiments, so parts similar or corresponding to the parts of preceding embodiments will be marked by the same reference numerals.

As shown in FIG. 4, the brake boosting system 1 of the second embodiment comprises an O-ring 78 provided around the outer surface of the primary piston 12, instead of the first cup sealing member 16 defining the pressure intensifying chamber 21 and the second cup sealing member 17 defining the first annular fluid chamber 22 in the first embodiment.

In the second embodiment, an output shaft 11 of a vacuum booster (not shown in FIG. 4) and an input rod 11' of a master cylinder 3 are separately formed. In this case, the front end of the input rod 11' is slidably fitted in a second axial hole 27 of the primary piston 12. The front end of the input rod 11' is a stepped rod comprising a small-diameter portion 11a', a large-diameter portion 11b', and a step portion 11c' formed between the portions 11a' and 11b', whereat the second axial hole 27 is a stepped hole comprising a small-diameter hole 27a and a large-diameter hole 27b. The small-diameter portion 11a' of the input rod 11' is slidably fitted in the small-diameter hole 27a of the second axial hole 27 and the large-diameter portion 11b' is slidably fitted in the large-diameter hole 27b. In the second embodiment, the sixth and seventh cup sealing members 30, 31 of the first embodiment are omitted and the sealing between the input rod 11' and the second axial hole 27 is ensured by the slidable fitting of the input rod 11' into the second axial hole 27.

The large-diameter hole 27b of the second axial hole 27 is provided with an axial groove 79 formed in a portion at the inner surface thereof. The axial groove 79 always communicates with the reservoir 9 through a passage 37 and the first annular fluid chamber 22. The primary piston 12 and the input rod 11' are positioned when the brake system is inoperative in such a manner that the end of the input rod 11' is in contact with the primary piston 12. In this state, the step 11c' is positioned in a range of the large-diameter hole 27b where the axial groove 79 does not extend. Therefore, the reaction chamber 33 and the pressure intensifying chamber 21 both are shut off from the axial groove 79 i.e. the reservoir 9. When the input rod 11' moves rearward relative to the primary piston 12, the step 11c' is positioned in a range of the large-diameter hole 27b where the axial groove 79 extends. Therefore, the reaction chamber 33 and the pressure intensifying chamber 21 communicate with the axial groove 79 i.e. the reservoir 9. The second return spring 35 compressed and disposed between the output shaft 11 and the primary piston 12 in the first embodiment is omitted in the second embodiment.

Instead of the check valve 77 of the first embodiment, an eighth cup sealing member 77' is provided and a line 74 at the pump 53 side is connected to the line 76 at the pressure intensifying chamber 21 side by the eighth cup sealing member 77' in the second embodiment.

The other structure of the brake boosting system 1 of the second embodiment is the same as that of the first embodiment.

Since the brake boosting system 1 of the second embodiment as structured above is in the illustrated state when it is inoperative, the step 11c' is positioned in the range of the large-diameter hole 27b where the axial groove 79 does not extend and both the reaction chamber 33 and the pressure intensifying chamber 21 are shut off from the reservoir 9 so as to be in the sealed state.

When the normal braking operation is conducted at this state, the vacuum booster is actuated so that the output thereof is transmitted to the input rod 11' through the output shaft 11. Then, the input rod 11' and the primary piston 12 advance so that the normal braking action is obtained in two circuits in the same manner as the first embodiment mentioned above. At this point, the volume of the pressure intensifying chamber 21 is increased. Since the brake fluid in the reservoir 9 passes an outer lip of the eighth cup sealing member 77' and is supplied into the pressure intensifying chamber 21, however, the primary piston 12 smoothly advances.

When the normal braking is cancelled, the reaction chamber 33 and the pressure intensifying chamber 21 are both in the sealed state, so the primary piston 12 does not retreat in the same manner as the first embodiment but only the input rod 11' retreats. Then, the step 11'c is positioned in a range of the large-diameter hole 27b where the axial groove 79 extends so that the reaction chamber 33 and the pressure intensifying chamber 21 both communicate with the reservoir 9 to allow the brake fluid in the reaction chamber 33 and the pressure intensifying chamber 21 to be discharged to the reservoir 9. Therefore, in the same manner as the first embodiment, the primary piston 12 retreats while discharging the brake fluid in the reaction chamber 33 and the pressure intensifying chamber 21 to the reservoir 9. In this way, the normal braking is cancelled.

The input-output characteristics of the master cylinder 3 during the normal braking is expressed by the same equation 1 as the first embodiment.

Just like the first embodiment, as the brake pedal is pedaled with power requiring the braking assist control, the pressure in the pressure intensifying chamber 21 is intensified corresponding to the input by supplying discharge pressure from the pump 53 to the pressure intensifying chamber 21, so the primary piston 12 advances by the intensified pressure of the pressure intensifying chamber 21, thereby conducting braking action. The output of the master cylinder 3 is expressed by the same equation as Equation 2 but without the spring force of the second return spring 35. In this case, therefore, the master cylinder 3 outputs at a higher servo ratio.

The canceling operation of the braking action accompanied with the braking assist control is as follows. That is, as the brake pedal is released, the input shaft 11' retreats so that the step 11c is positioned in the range of the large-diameter hole 27b where the axial groove 79 extends so that the radial hole 38 is connected to the axial groove 79. Therefore, the reaction chamber 33 and the pressure intensifying chamber 21 both communicate with the reservoir 9. After that, the primary piston 12 and the secondary piston 13 both retreat, thereby releasing the braking action in the same manner as the first embodiment.

The other action of the brake boosting system 1 of the second embodiment is the same as that of the first embodiment.

Figure 5:
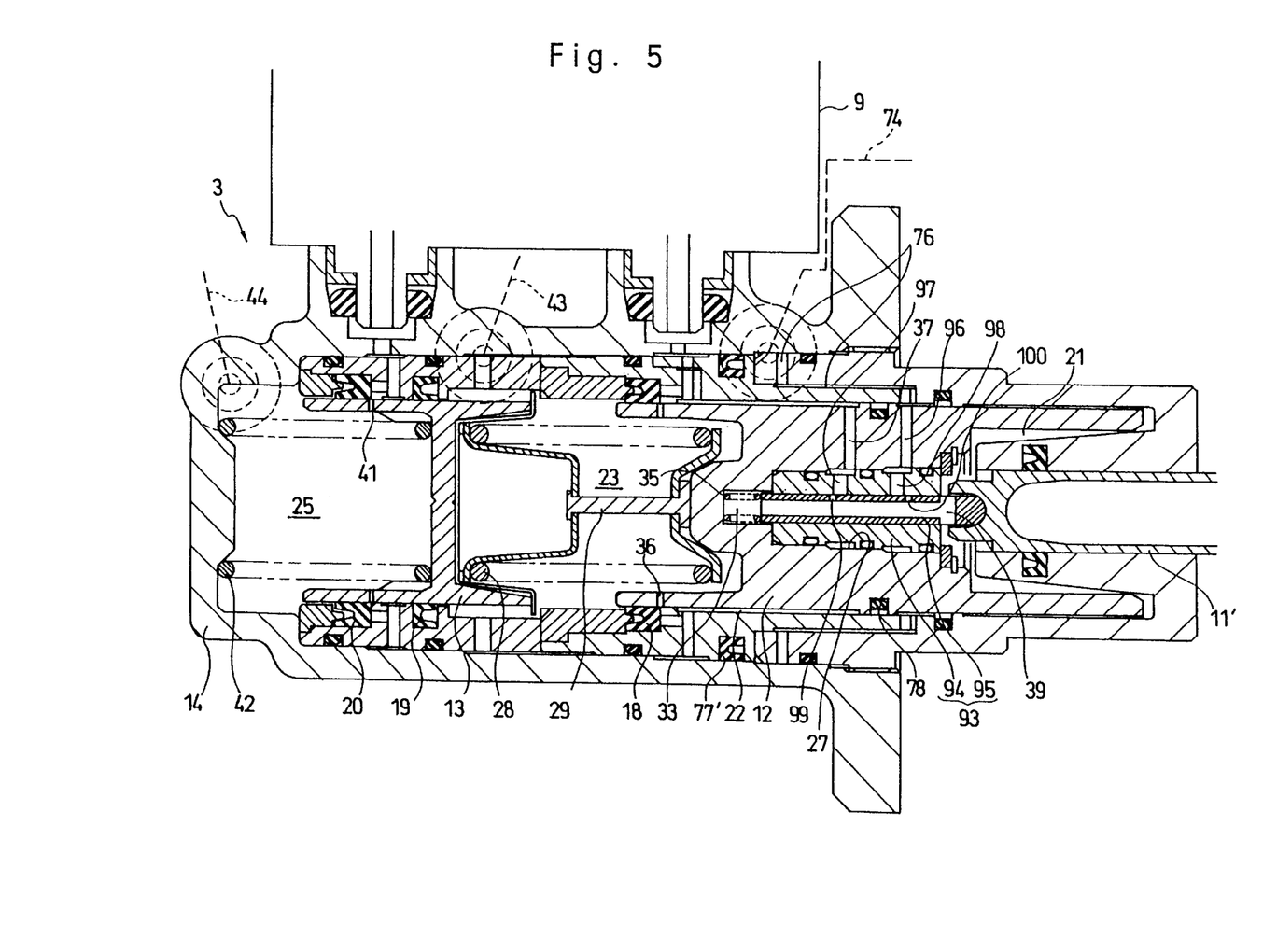
FIG. 5 is a sectional view showing a third embodiment of the present invention.

FIG. 5 is a view showing the third embodiment of the present invention.

In the aforementioned brake boosting system 1 of the second embodiment, the pressure intensifying chamber 21 and the reaction chamber 33 always communicate with the line 74, the pressure intensifying chamber 21 and the reaction chamber 33 are shut off from the reservoir 9 when the braking assist control is inoperative i.e. the discharge pressure of the pump 53 is not supplied to the pressure intensifying chamber 21, and the pressure intensifying chamber 21 and the reaction chamber 33 are shut off from the reservoir 9 when the braking assist control is conducted i.e. the pump discharge pressure is supplied from the pump 53 to the pressure intensifying chamber 21. In a brake boosting system 1 of the third embodiment, however, a pressure intensifying chamber 21 and a reaction chamber 33 are shut off from a line 74 and communicate with the reservoir 9 when an input shaft 11' is inoperative, and the pressure intensifying chamber 21 and the reaction chamber 33 communicate with the line 74 and are shut off from the reservoir 9 when the input shaft 11' advances relative to the primary piston 12, that is, the brake boosting system 1 is of a closed centre type.

That is, the brake boosting system 1 of the third embodiment is provided with a control valve 93 which is a spool valve disposed in a primary piston 12. The control valve 93 comprises a stepped sleeve 94 sealingly fitted in a second axial hole 27 with a step of the primary piston 12, and a valve spool 95 slidably fitted in a central axial hole of the sleeve 94 and connected to the input shaft 11'. The valve spool 95 is always biased in an inoperative direction by a second return spring 35. The primary piston 12 is provided with a passage 96 formed therein which always communicates with the line 74, in addition to the passage 37 which always communicates with the reservoir 9. The sleeve 94 is provided with passages 97, 98 formed therein which always communicate with the passage 37, 96, respectively.

Further, the valve spool 95 is provided with a passage 39 and radial holes 99, 100 formed therein. The radial holes 99, 100 allow the communication between the passage 39 and the space around the outer surface of the valve spool 95. The radial hole 99 is connected to the passage 37 when the system is inoperative as illustrated. As the valve spool 95 advances when the system is operative, the radial hole 99 is shut off from the passage 37. The radial hole 100 is shut off from the passage 98 when the system is inoperative as illustrated. As the valve spool 95 advances when the system is operative, the radial hole 100 is connected to the passage 98.

The other structure of the brake boosting system 1 of the third embodiment is the same as that of the second embodiment.

In the brake boosting system 1 of the third embodiment as structured above, the normal braking is conducted by that input shaft 11' advances to come in contact with the sleeve 94 i.e. primary piston 12 and, after that, in the same manner as the first and second embodiments. When the input shaft 11' advances, the control valve 93 is switched to shut off the pressure intensifying chamber 21 from the reservoir 9 and to connect the pressure intensifying chamber 21 to the line 74. Since a solenoid switching valve 75 and a pump 53 are not actuated, pump discharge pressure is not supplied to the pressure intensifying chamber 21.

During assisted braking operation, the control valve 93 is switched and the solenoid switching valve 75 and the pump 53 are actuated so that the pump discharge pressure is supplied to the pressure intensifying chamber 21, whereby the braking assist action is obtained in the same manner as the aforementioned embodiments.

The other action and effects of the brake boosting system 1 of the third embodiment are also the same as those of the second embodiment.

Figure 6:
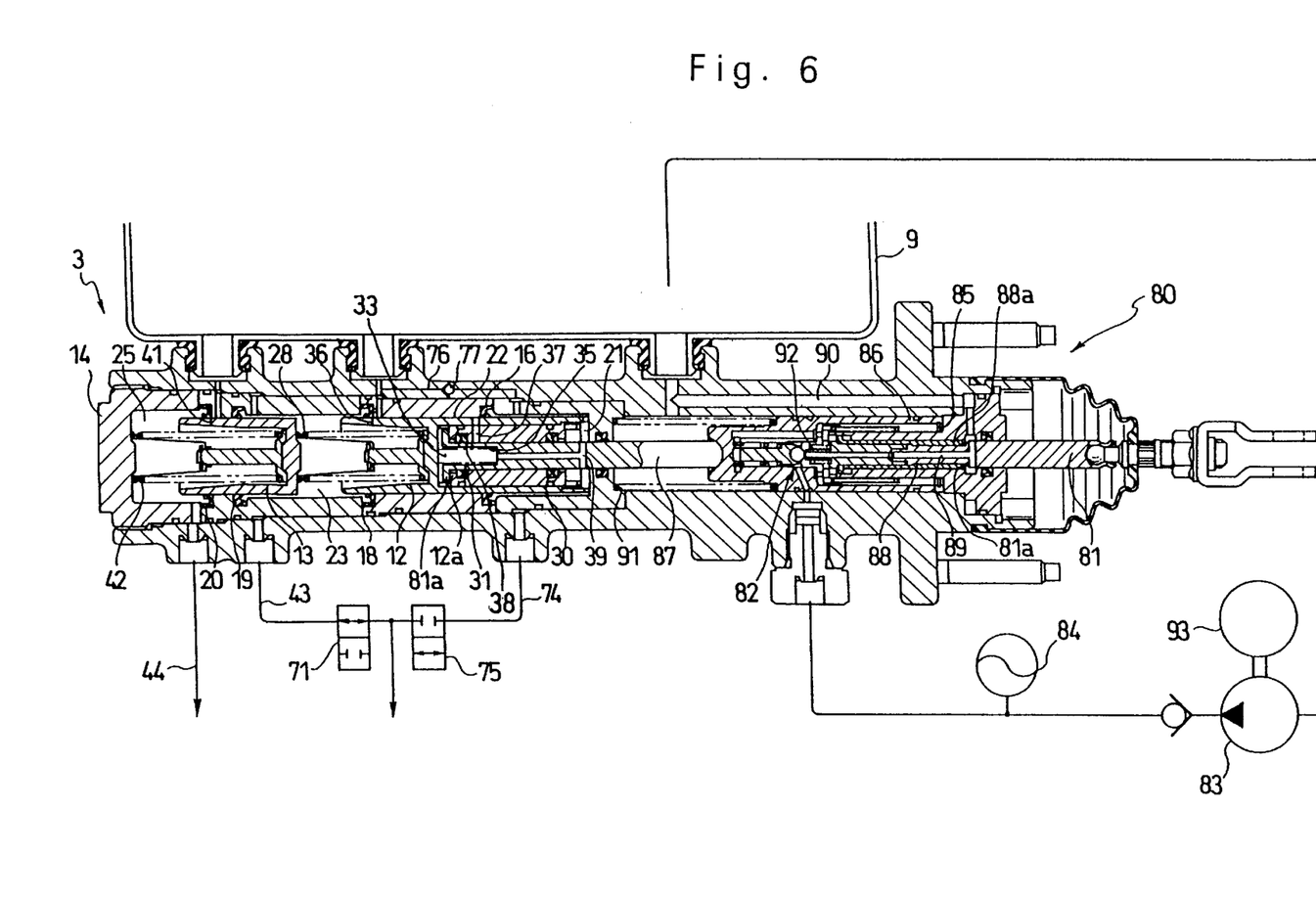
FIG. 6 is a sectional view showing a fourth embodiment of the present invention.

FIG. 6 is a view showing the fourth embodiment of the present invention.

Though the vacuum booster 2 and the master cylinder 3 are employed in combination in the above embodiments, a hydraulic booster 80 is employed in the brake boosting system 1 of the fourth embodiment as shown in FIG. 6. The hydraulic booster 80 is the same as the hydraulic booster disclosed in Japanese Utility model Registered No. 2551658. Since the reference of a microfilm which contains the No. 2551658 makes Is possible to understand the hydraulic booster 80, the detail description is omitted. Only the simple description will be made as regard to the operation thereof. As the brake pedal not shown is pedaled, an input shaft 81 advances to switch a control valve 82. Then, fluid pressure in an accumulator 84 accumulated by a pump 83 is supplied to a power chamber 85 so that a power piston 86 is actuated and boosts leg power exerted on the brake pedal to output through an output shaft 87.

In the initial stage of operation of the hydraulic booster 80, a rear end portion 88a of the reaction piston 88 is not in contact with a step 81a of the input shaft 81 so that the hydraulic booster 80 performs a servo control at a higher servo ratio. When the fluid pressure in the power chamber 85 reaches a predetermined value, that is the input of the hydraulic booster 80 reaches a predetermined value, the reaction piston 88 retreats relative to the input shaft 81 so that the rear end portion 88a comes in contact with the step 81a of the input shaft 81. The hydraulic booster 80 starts to perform a servo control at a lower servo ratio (the servo ratio for the normal braking). Thus, the hydraulic booster 80 has the jumping characteristic whereby the rise in the output is increased in the initial stage of braking operation.

As the brake pedal is released, the input shaft 81 retreats and the control valve 82 is set in the inoperative state. The pressurized fluid in the power chamber 85 is discharged to the reservoir 9 through a discharge passage 89 formed in the input shaft 81 and a discharge passage 90 formed in a housing 14. As a result, the hydraulic booster 80 becomes inoperative.

In the fourth embodiment, the sectional area (effective pressure receiving area) of the power piston 86 and the sectional area of the primary piston 12 are set to be equal to each other.

Though the output shaft 11 comes in contact with the primary piston 12 only when the output shaft 11 advances relative to the primary piston 12 in the first embodiment, the output shaft 87 comes in contact with the primary piston 12 either when the output shaft 87 advances and when it retreats relative to the primary piston 12. For this, a flange 87a (not shown) is provided at the front end of the output shaft 87 and a contact portion 12a, operating the flange 87a when the output shaft 87 retreats relative to the primary piston 12, is formed in the primary piston 12. The other structure of the output shaft 87 is the same as that of the output shaft 11 of the first embodiment and the other structure of the primary piston 12 is the same as that of the primary piston 12 of the first embodiment.

The second cup sealing member 17 in first embodiment is omitted in the fourth embodiment. The numeral 93 designates a motor for driving a pump 83.

The other structure of the brake boosting system 1 of the fourth embodiment is the same as that of the first embodiment. The action of the brake boosting system 1 of the fourth embodiment is the same as that of the first embodiment.

Assuming that the sectional area of the input shaft 81 is C, the spring force of the return spring 91 of the hydraulic booster is $SPG_3$, and the spring force of the return spring 92 of the input shaft 81 is SPG, the MCY pressure $P_1$ relative to the input $F_1$ of the input shaft 81 during the normal braking in the fourth embodiment is found by the following Equation 3;

$$P_1 = F_1/C - SPG_1/A - SPG_3/A - SPG_4/C \qquad (3)$$

MCY pressure P2 relative to the input $F_1$ of the input shaft 81 during the assisted braking is found by the following Equation 4;

$$P_2 = (A/B*C)*F_1 - SPG_2/B - SPG_3 B - SPG_4/C \qquad (4)$$

As comparison between Equation 3 and Equation 4 is made, the MCY pressure $P_2$ produced during the assisted braking is (A/B) times as higher then as the MCY pressure $P_1$ produced during the normal braking. Because B<A, 1<(A/B) is obtained, so it is found that the higher MCY pressure is produced during the asserted braking than a case of the normal braking.

Though the hydraulic booster with the jumping characteristic by virtue of the reaction piston 88 is employed in the fourth embodiment, a typical hydraulic booster without the reaction piston 88 may be employed.

Though either one of the vacuum booster 2 and the hydraulic booster 80 is employed in the aforementioned embodiments, a booster using compressed air pressure or electromagnetic force may be employed. Through the pump is used as the fluid pressure source, accumulated pressure in the accumulator regulated by a pressure regulator may be used.

As apparent from the above description, according to the brake boosting system of the present invention, when the braking assist is required, the fluid pressure in the fluid pressure source is supplied to the pressure intensifying chamber to intensify the master cylinder pressure of the master cylinder so that braking force larger than that for normal braking can be obtained. The braking assist can be securely obtained when it is required to quickly provide large braking force such as emergency braking.

The brake boosting system can be simply structured only by providing the pressure intensifying chamber and the reaction chamber in the master cylinder and controlling the supply and discharge of fluid pressure relative to the pressure intensifying chamber.

Also according to the present invention, since the ABS pump or the TRC pump, which is already provided, is also used as the fluid pressure source so that another pump exclusively for the braking assist control is not required, the brake pressure boosting system with braking assist function can be made at a lower cost without increase in the number of the parts.

According to the present invention, the input is boosted by the booster and the master cylinder pressure is further intensified when the braking assist is necessary, so large braking force can be rapidly and securely obtained even with not large input when it is required to quickly provide large braking force such as emergency braking. In addition, large braking force can be ensured even in the event of the pressure fluid failure by that the braking assist control is conducted by the electronic control unit to intensify the master cylinder pressure.

Moreover, large braking force is securely obtained even with negative pressure lowered in terms of the fuel consumption reduction of an engine, thereby effectively coping with the tendency of negative pressure reduction.

What is claimed is:

1. A brake boosting system comprising:
   a brake operating member for braking operation,
   an input shaft operated by the brake operating member,
   a reservoir for storing a brake fluid,
   a master cylinder having a master cylinder piston and actuated by the input shaft for producing a master cylinder pressure,
   a brake cylinder communicating with the master cylinder for producing a braking force when the master cylinder pressure is introduced into the brake cylinder,
   a pressure intensifying chamber facing one end of the master cylinder chamber,
   a reaction chamber disposed between the master cylinder piston and the input shaft and always communicating with the pressure intensifying chamber,
   a fluid pressure source for producing fluid pressure and supplying the fluid pressure into the pressure intensifying chamber, and
   communication control means which allows the pressure intensifying chamber and the reaction chamber to communicate with the reservoir when the system has not advanced and intercepts the pressure intensifying chamber and the reaction chamber from communicating with the reservoir when the input shaft advances, said communication control means having a solenoid control valve disposed between the pressure intensifying chamber and the fluid pressure source for controlling communication between the pressure intensifying chamber and the fluid pressure source.

2. A brake boosting system as claimed in claim 1, wherein said solenoid control valve intercepts the pressure intensifying chamber and the reaction chamber from communicating with the fluid pressure source when the system has not advanced, and allows the pressure intensifying chamber and the reaction chamber to communicate with the fluid pressure source when the input shaft advances.

3. A brake boosting system as claimed in claim 1, wherein said communication control means includes a spool valve.

4. A brake boosting system as claimed in claim 1, further comprising a booster for boosting an input from said brake operating member and outputting a boosted power through an output shaft thereof, wherein an input shaft of said master cylinder is actuated through the output shaft of said booster, or, the output shaft of said booster composes said input shaft of said master cylinder.

5. A brake boosting system as claimed in claim 4, wherein said booster is operable by negative pressure, fluid pressure, compressed air pressure, or electromagnetic force.

6. A brake boosting system as claimed in claim 1, wherein said solenoid control valve is disposed on a fluid pressure supplying line between said pressure intensifying chamber and said fluid pressure source, and an electronic control unit which determines whether normal braking should be conducted or braking assist is necessary, corresponding to a brake operational condition including a leg power exerted on said brake operating member and a rate of rise of the leg power, sets said solenoid control valve to a shut-off position when it is decided that the normal braking should be conducted, and sets said solenoid control valve to a communication position when it is decided that the braking assist is necessary.

7. A brake boosting system as claimed in claim 4, wherein said solenoid control valve is disposed on a fluid pressure supplying line between said pressure intensifying chamber and said fluid pressure source, and an electronic control unit which, corresponding to a pressure of a pressure source for said booster, sets said solenoid control valve to a shut-off position when said pressure exceeds a predetermined value, and sets said solenoid control valve to a communication position when said pressure is lower than the predetermined value.

8. A brake boosting system as claimed in claim 6, wherein said fluid pressure source is a pump, and said electronic control unit does not actuate said pump when it is decided that the normal braking should be conducted, and actuates said pump to supply a pump discharge pressure of said pump to said pressure intensifying chamber when it is decided that the braking assist is necessary.

9. A brake boosting system as claimed in claim 8, wherein said pump is a pump for anti-skid control, a pump for traction control, or a pump for both anti-skid control and traction control.

* * * * *